United States Patent [19]
Czarnik

[11] Patent Number: 5,648,102
[45] Date of Patent: Jul. 15, 1997

[54] VACUUM CALIBRATOR TOOL

[75] Inventor: David H. Czarnik, Twining, Mich.

[73] Assignee: The Conair Group, Inc., Pittsburgh, Pa.

[21] Appl. No.: 512,139

[22] Filed: Aug. 7, 1995

[51] Int. Cl.⁶ .................................................. B29C 47/90
[52] U.S. Cl. .............................. 425/71; 264/562; 425/92; 425/326.1; 425/388
[58] Field of Search ........................ 425/71, 92, 326.1, 425/388; 264/562, 566

[56] References Cited

U.S. PATENT DOCUMENTS

| | | | |
|---|---|---|---|
| 3,541,189 | 11/1970 | Yoshikawa et al. | 425/71 |
| 3,717,426 | 2/1973 | Tucking et al. | 425/71 |
| 4,022,557 | 5/1977 | Johnson | 425/71 |
| 4,029,452 | 6/1977 | Schippers et al. | 425/71 |
| 4,543,051 | 9/1985 | Maillefer | 425/71 |
| 4,740,146 | 4/1988 | Angelbeck | 425/71 |
| 5,464,335 | 11/1995 | Bessemer et al. | 425/71 |
| 5,516,270 | 5/1996 | Lehtinen | 425/326.1 |

FOREIGN PATENT DOCUMENTS 1 911 223  9/1970  Germany ........................ 425/71

*Primary Examiner*—Robert Davis
*Attorney, Agent, or Firm*—Buchanan Ingersoll, P.C.

[57] ABSTRACT

A vacuum calibrator tool for use with a vacuum chamber is provided to accurately size and shape the outer surface of molten plastic extrudate entering the vacuum chamber. The tool provides water passages to introduce water into the extrudate receiving opening of the tool at several positions along the extrudate receiving opening so that an extended zone of water within the extrudate receiving opening provides a film of water between the vacuum calibrator tool and the extrudate passing through it to lubricate the extrudate and to permit accurate sizing and shaping of the extrudate. The vacuum calibrator tool is preferably formed of a low coefficient of friction plastic material such as glass filled polytetrafluroethylene solid commercially under the registered trademark TEFLON®.

11 Claims, 3 Drawing Sheets

FIG. 3

VACUUM CALIBRATOR TOOL

BACKGROUND OF THE INVENTION

1. Field of the Invention

This invention relates to a vacuum calibrator tool for sizing molten plastic extrudate as it leaves an extruder and enters a vacuum tank containing water through which the extrudate passes as it cools and hardens. The vacuum calibrator tool has a film of water created between the extrudate and the tool to lubricate the extrudate and to permit the tool to accurately size and shape the extrudate as it enters the vacuum sizing tank.

2. Description of the Prior Art

Efforts have been made in the plastics industry to provide for the controlled cooling and accurate sizing of molten plastic extrudate after it leaves the plastic extruder. The extrudate can easily be deformed if excessive pressure is applied to the outer surface of the extrudate. To prevent this type of deformation, vacuum cooling and sizing tanks have been developed that have a water bath within a vacuum chamber which prevents excessive pressure from being applied to the surface of the extrudate as it cools. An example of such an arrangement is found in U.S. Pat. No. 5,340,295 entitled "Vacuum Sizing Apparatus With Controlled Vacuum".

When very small diameter tubing or other small extrudate is cooled in a vacuum chamber, it is essential to initially accurately size and shape the extrudate as it enters the vacuum chamber. Because the extrudate is somewhat fragile at that point, various tools employing water rings have been utilized to produce a film of water around the extrudate as it enters a sizing tool and proceeds through the sizing tool into the vacuum chamber.

It has been found that the prior vacuum calibrator tools that have been used for sizing the extrudate as it enters the vacuum chamber have not adequately provided for sufficient water film to lubricate the interior of the tool and to permit the extrudate to move readily through the tool without coming into contact with the surfaces of the tool. The present invention provides a vacuum calibrator tool that has an extended area of water lubrication of the extrudate after it enters the sizing tool so that the extrudate may be accurately sized and shaped. This sizing tool is particularly useful for sizing extrudate of small diameter medical tubing, electronic shrink tubing, and fiber optic cable where close tolerances are required for the finished product.

SUMMARY OF THE INVENTION

In accordance with the present invention, there is provided a vacuum calibrator tool for use with a vacuum chamber for accurately sizing the outer surface of molten plastic extrudate that is thereafter cooled and solidified within a water bath in said vacuum chamber. The vacuum calibrator tool includes a tool housing having an extrudate receiving opening formed therethrough the size and shape of the outer surface of the extrudate to be passed through the tool. A chamber is formed in the tool housing surrounding the extrudate receiving opening and a water conduit is formed in the said tool housing to introduce water into the chamber. A first plurality of water passages are formed within the tool housing extending radially inwardly from the chamber to the extrudate receiving opening to introduce water to the extrudate receiving opening where the extrudate first enters the opening. A second plurality of water passages are formed within the tool housing extending radially inwardly from the chamber to the extrudate receiving opening to introduce water to the extrudate receiving opening at a position further into the extrudate receiving opening than the water introduced by the first plurality of water passages in the direction of movement of the extrudate through the opening. The first and second plurality of water passages provide a thin layer of water between the wall of the extrudate receiving opening and the extrudate to lubricate the extrudate as it is sized by the vacuum calibrator tool.

Accordingly, a principal object of the present invention is to provide an improved vacuum calibrator tool for precision sizing and shaping of plastic extrudate.

Another object of the present invention is to provide a vacuum calibrator tool that provides a film of water between the calibrator tool and the extrudate passing through it over an extended surface from the point at which the extrudate enters the tool.

These an other objects of the present invention will be more completely disclosed and described in the following specification, the accompanying drawings and the appended claims.

DESCRIPTION OF THE PREFERRED EMBODIMENT

Figure 1:
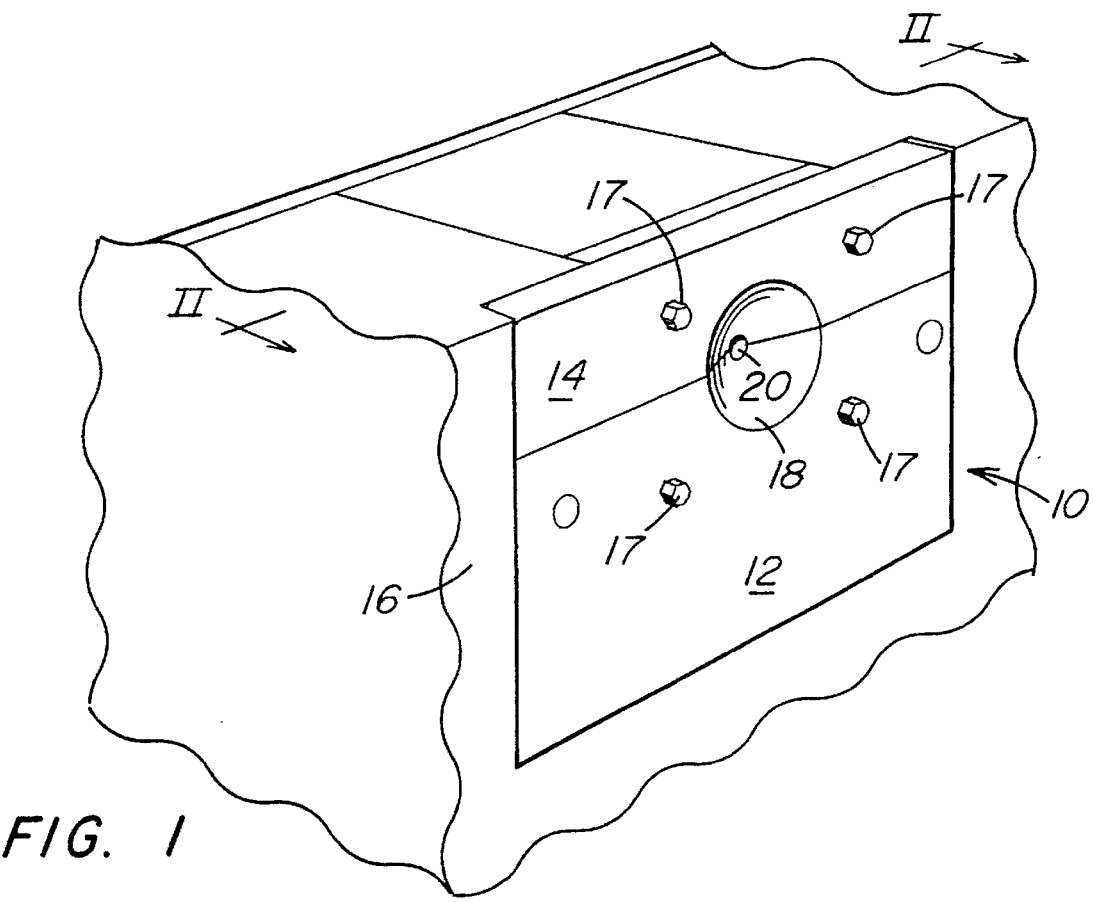
FIG. 1 is a perspective view of the vacuum calibrator tool of the present invention.
Figure 2:
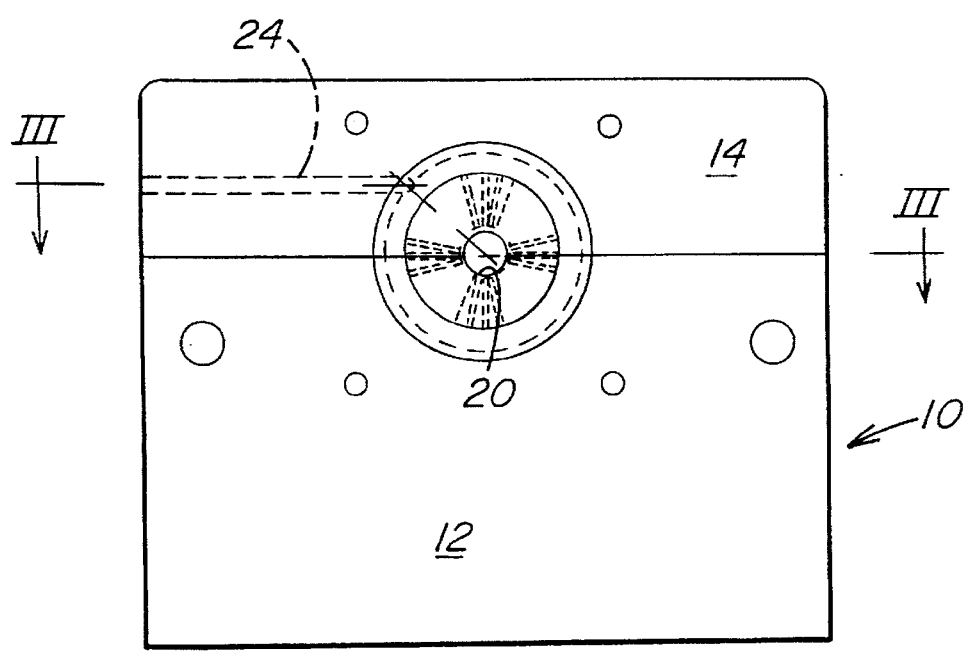
FIG. 2 is an end elevation taken along line II—II of FIG. 1 viewing the vacuum calibrator tool of the present invention from within the vacuum sizing tank with which it is utilized.

Referring to the drawings there is shown a vacuum calibrator tool 10 having a lower housing 12 and an upper housing 14. The vacuum calibrator tool 10 is secured within the end wall 16 of a vacuum sizing tank by bolts 17. The vacuum sizing tank is preferably of the type disclosed in U.S. patent application Ser. No. 08/298,325 filed Aug. 30, 1994 and entitled "Vacuum Tank For Vacuum Sizing Apparatus" U.S. Pat. No. 5,464,335.

Figure 3:
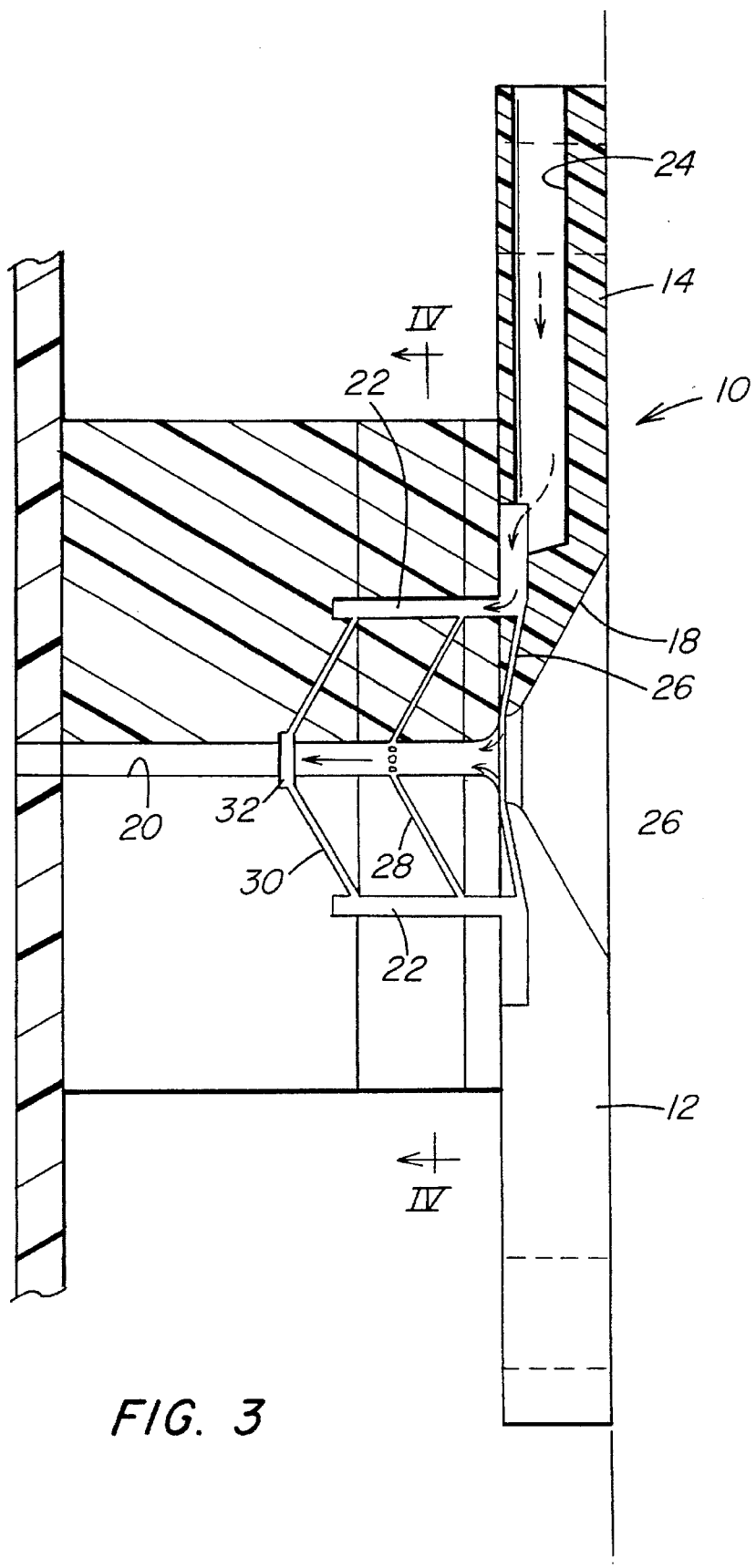
FIG. 3 is a partial section of the vacuum calibrator tool taken along line III—III of FIG. 2.

As best shown in FIGS. 1 and 3, the vacuum calibrator tool 10 has an extrudate entry cone 18 formed where the extrudate first enters the calibrator tool 10. The extrudate entry cone 18 connects to an extrudate receiving opening 20 that extends through the calibrator tool 10 and through which the extrudate passes in a direction shown by the arrow in FIG. 3.

Formed around the extrudate receiving opening 20 is an annular chamber 22 which receives water input to the vacuum calibrator tool 10 through water conduit 24 formed in the upper housing 14.

Water passages 26 are formed within the housing of vacuum calibrator tool 10 to extend radially from the annular chamber 22 to the point where extrudate entry cone 18 joins extrudate receiving opening 20. Preferably the passages 26 are formed at 10° intervals around the entire periphery of extrudate receiving opening 20 in a fashion similar to the water passages 28 shown in FIG. 4 that form a second set of water passages. The first plurality of water passages 26 introduce water at the point where the extrudate first enters the extrudate receiving opening 20.

Figure 4:
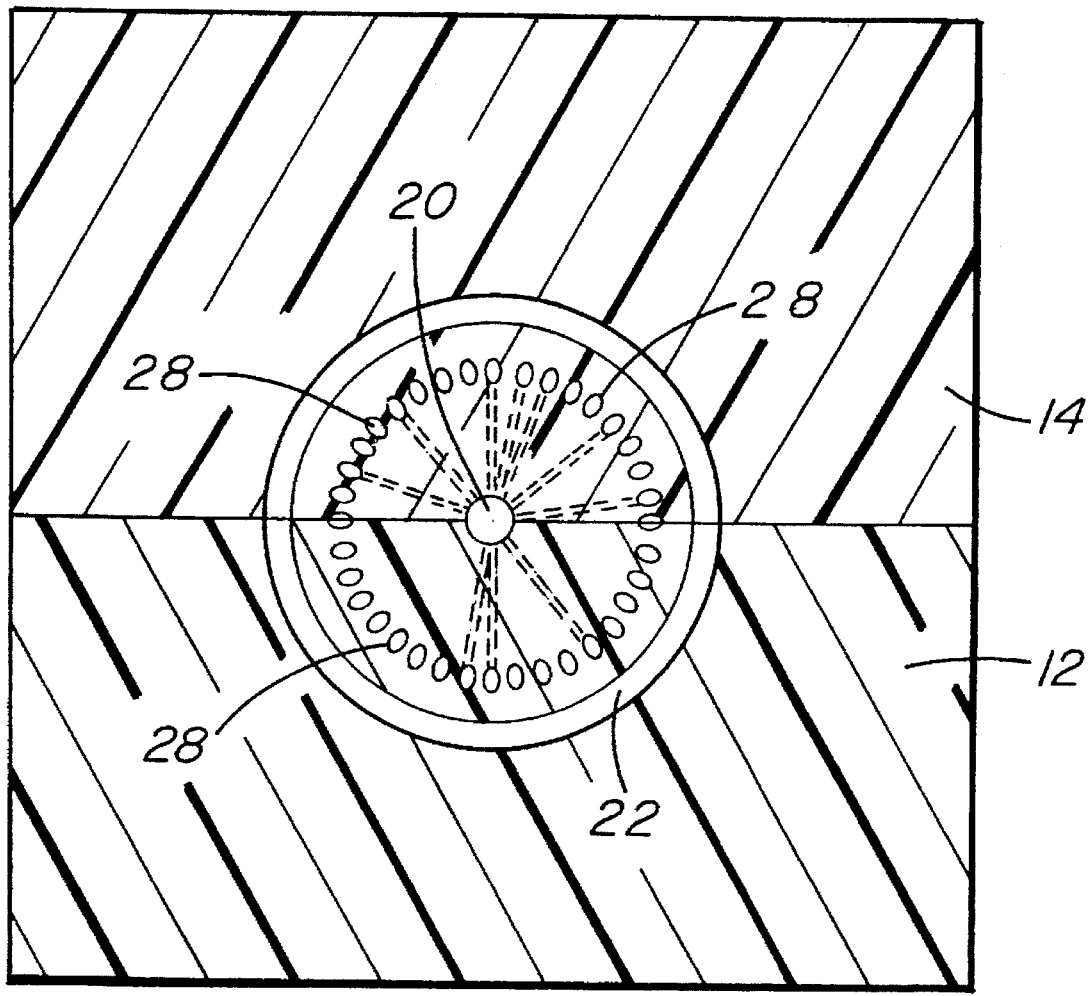
FIG. 4 is a sectional elevation taken along line IV—IV of FIG. 3.

The second plurality of water passages 28 introduce water from the annular chamber 22 to the extrudate receiving opening 20 further down stream in the direction of extrudate flow then do the first plurality of passages 26. As shown in FIG. 4, the water passages 28 are positioned at 10° intervals about the periphery of the extrudate receiving opening 20. While it may not always be practical to utilize water passages at 10° intervals, the first plurality of water passages 26 and the second plurality of water passages 28 should number at least 10 passages each to provide adequate water to the extrudate receiving opening 20.

In some instances for some extrudate that is particularly difficult to form, it may be desirable to add a third plurality of water passages 30 which introduce water from the annular chamber 22 to the extrudate receiving opening 20 further downstream in the direction of extrudate flow than the water introduced by the second plurality of water passages 28. Again, the third plurality of water passages 30 are preferably formed at 10° intervals around the periphery of extrudate receiving opening 20. It may also be desirable to provide an annular chamber 32 around the extrudate receiving opening 20 to receive water from water passages 30 so that the water completely surrounds the extrudate and provides a smooth film. A similar annular chamber can be provided to receive water from passages 28 if desired.

After the extrudate passes through the vacuum calibrator tool 10, it enters into the water within the vacuum sizing tank and is cooled and hardened to provide an extruded plastic product.

It can be seen that by providing water passages that enter the extrudate receiving opening 20 at various points along the length of extrudate receiving opening 20 an extended portion of the extrudate entering the vacuum calibrator tool 10 is surrounded by a water film that lubricates it and keeps the molten extrudate from sticking to surface of the vacuum calibrator tool 10.

The vacuum calibrator tool 10 is preferably formed from a low co-efficient of friction plastic material such as glass filled polytetrafluoroethylene sold commercially under the registered trademark TEFLON®. By forming the tool from such low friction material, the lubricating properties of the water entering the extrudate receiving opening 20 further enhances the low friction nature of the vacuum calibrator tool 10.

Because the vacuum calibrator tool 10 is formed with a lower housing 12 and an upper housing 14, the extrudate may be threaded through the tool 10 before the upper housing 14 is put into position over the lower housing 12 to facilitate the initial movement of the extrudate through the tool 10. Water will not begin to flow through conduit 24 to annular chamber 22 until the upper housing 14 is positioned over lower housing 12 since the water conduit 24 is formed in the upper housing 14.

According to the provisions of the patent statutes, I have explained the principle, preferred construction and mode of operation of my invention and illustrated and described what I now consider to represents its best embodiment. However, it should be understood that, within the scope of the appended claims, the invention may be practiced otherwise than as specifically illustrated and described.

I claim:

1. A vacuum calibrator tool for use with a vacuum chamber for accurately sizing a molten plastic extrudate having an outer surface, said molten plastic extrudate being thereafter cooled and solidified within a water bath in said vacuum chamber, said vacuum calibrator tool comprising:

a tool housing having an extrudate receiving opening formed therethrough the size and shape of said outer surface of said extrudate to be passed through said tool;

said tool housing being attached to an external wall of said vacuum chamber whereby no part of said tool enters into said vacuum chamber and is thereby isolated from said water bath located within said vacuum chamber;

a water chamber formed in said tool housing surrounding said extrudate receiving opening;

a water conduit formed in said tool housing to introduce water into said water chamber;

a first plurality of water passages formed within said tool housing extending radially inwardly form said water chamber to said extrudate receiving opening to introduce water to said extrudate receiving opening where said extrudate first enters said opening;

a second plurality of water passages formed within said tool housing extending radially inwardly from said water chamber to said extrudate receiving opening to introduce water to said extrudate receiving opening at a position further into said extrudate receiving opening than the water introduced by said first plurality of water passages in the direction of movement of said extrudate through said opening;

said first and second plurality of water passages introducing a thin layer of water between said extrudate receiving opening and said extrudate to lubricate said extrudate as it is sized by said vacuum calibrator tool.

2. The vacuum calibrator tool of claim 1 wherein said first plurality of water passages contains at least ten passages.

3. The vacuum calibrator tool of claim 1 wherein said second plurality of water passages contains at least ten passages.

4. The vacuum calibrator tool of claim 1 wherein said tool housing is divided horizontally through said extrudate receiving opening into two parts to permit ease of threading said extrudate through said tool.

5. The vacuum calibrator tool of claim 1 wherein said tool is readily replaceable in said vacuum chamber to accommodate various sizes and shapes of extrudate.

6. The vacuum calibrator tool of claim 1 wherein said tool is formed of a low coefficient of friction material.

7. The vacuum calibrator tool of claim 1 wherein said extrudate receiving opening is round.

8. A vacuum calibrator tool for use with a vacuum chamber for accurately sizing a molten plastic extrudate having an outer surface, said molten plastic extrudate being thereafter cooled and solidified within a water bath in said vacuum chamber, said vacuum calibrator tool comprising:

a housing manufactured in two parts comprising an upper portion and a lower portion from a low coefficient of friction material and having an extrudate receiving opening formed therethrough the size and shape of said extrudate to be passed through said tool, said housing being divided horizontally through said extrudate receiving opening:

said tool housing being attached to an external wall of said vacuum chamber whereby no part of said tool enters into said vacuum chamber and is thereby isolated from said water bath located within said vacuum chamber;

an annular water chamber formed in said tool housing surrounding said extrudate receiving opening;

a water conduit formed in said tool housing to introduce water into said annular water chamber;

a first plurality of more than ten water passages formed within said tool housing extending radially inwardly from said annular water chamber to said extrudate receiving opening to introduce water to said extrudate receiving opening where said extrudate first enters said opening;

a second plurality of more than ten water passages formed within said tool housing extending radially inwardly from said annular water chamber to said extrudate receiving opening to introduce water to said extrudate receiving opening at a position further into said extrudate receiving opening than the water introduced by said first plurality of water passages in the direction of movement of said extrudate through said opening;

said first and second plurality of water passages providing a thin layer of water between said extrudate receiving opening and said extrudate to lubricate said extrudate as it is sized by said vacuum calibrator tool.

9. The vacuum calibrator tool of claim 8 wherein said tool is readily replaceable in said vacuum chamber to accommodate various sizes and shapes of extrudate.

10. The vacuum calibrator tool of claim 8 wherein a third plurality of more than ten water passages is provided extending radially inwardly from said annular water chamber to said extrudate receiving opening to introduce water to said extrudate receiving opening than the water introduced by said second plurality of water passages in the direction of movement of said extrudate through said opening.

11. The vacuum calibrator tool of claim 8 wherein said water conduit is formed in said upper portion of said tool housing that is divided horizontally through said extrudate receiving opening.

* * * * *

UNITED STATES PATENT AND TRADEMARK OFFICE
CERTIFICATE OF CORRECTION

PATENT NO. : 5,648,102
DATED : July 15, 1997
INVENTOR(S) : DAVID H. CZARNIK

It is certified that error appears in the above-indentified patent and that said Letters Patent is hereby corrected as shown below:

At [57] Abstract, line 13, change "sold" to --solid--.

Signed and Sealed this

Third Day of February, 1998

BRUCE LEHMAN

Attest:

Attesting Officer          Commissioner of Patents and Trademarks